United States Patent [19]

Brauel

[11] Patent Number: 5,781,407
[45] Date of Patent: Jul. 14, 1998

[54] PORTABLE PERSONAL COMPUTERS WITH MULTI-DIRECTIONAL INFRARED COMMUNICATION

[75] Inventor: Eric S. Brauel, Spring, Tex.

[73] Assignee: Compaq Computer Corporation, Houston, Tex.

[21] Appl. No.: 668,848

[22] Filed: Jun. 24, 1996

[51] Int. Cl.$^6$ .................................. G06F 1/16; H05K 7/00
[52] U.S. Cl. .......................... 361/683; 361/680; 361/681
[58] Field of Search .................................. 361/680–686, 361/724–727; 364/708.1, 709.01, 709.12; 356/141.1, 141.2, 442, 444; G06F 1/16

[56] References Cited

U.S. PATENT DOCUMENTS

| | | | |
|---|---|---|---|
| 5,175,672 | 12/1992 | Conner et al. | 361/680 |
| 5,227,953 | 7/1993 | Lindberg et al. | 361/686 |
| 5,307,297 | 4/1994 | Iguchi et al. | 364/708.1 |
| 5,550,649 | 8/1996 | Wong et al. | 358/479 |
| 5,587,876 | 12/1996 | O'Brien et al. | 361/682 |

OTHER PUBLICATIONS

IBM ThinkPad 760E/760ED User's Guide (Apr. 1996), pp. 64–66.

*Primary Examiner*—Lynn D. Feild
*Attorney, Agent, or Firm*—Pravel, Hewitt, Kimball & Krieger

[57] ABSTRACT

A portable personal computer, such as a notebook computer, is provided with an infrared (IR) port which is accessible to IR light signals sent toward the frontal face or aspect of the computer, where the data entry mechanism, such as a keyboard or touchpad, is located. The computer system may also include a conventional, rear mounted infrared light entry port, so that infrared communications may be made to the computer from several directions, such as both the front and rear of the computer. This overcomes the need for special cabling and a separate electronics board for extra IR interface electronics in the portable computer housing, where space is typically at a premium.

13 Claims, 3 Drawing Sheets

PORTABLE PERSONAL COMPUTERS WITH MULTI-DIRECTIONAL INFRARED COMMUNICATION

BACKGROUND OF INVENTION

1. Field of Invention

The present invention relates to personal computers with infrared (IR) data communication capability.

2. Description of Prior Art

A number of commercially available portable personal computers, such as notebook computers or laptop computers, are provided with infrared (IR) communication ports so that data can be transmitted into the computer by infrared light signals. Typically, these ports have been located at the back or rear portion of the computer unit. Consequently, the IR electronics have been located near the back part of the computer where the input/output IR I/O connectors were located.

Recently, some notebook computers have added a second, separate IR communication port for the purpose of remote control of computer functions from in front of the computer. An example of where use of the second IR port is made is typically during presentations or demonstrations by remote control. As with home television remote control infrared control signals for computers travel by line-of-sight and are thus directional signals.

This has, however, presented problems. Typically, the computer peripherals such as the hard drive, floppy drive, battery and the like have been located in this front portion of the computer because space was available for them there. Because of this, placement of a second IR port at front portions of the computer has caused problems. A separate, special cable was required from the front-mounted second IR sensors to the IR electronics at the back part of the notebook. A separate electronics board for these front mounted IR sensors had to be mounted at the second IR port for the transmit and receive IR sensors, typically light-emitting diodes (LED's). This has thus increased the complexity and cost of units in situations where simplification and reduction of size are typically at a premium.

SUMMARY OF INVENTION

Briefly, the present invention is a new and improved personal computer system, in the preferred embodiment a portable personal computer such as a laptop or notebook computer. The computer system includes a processor and a data entry input mechanism for entry of data and processing commands or signals into the processor. The data entry input mechanism may be a keyboard, touchpad or the like.

The computer system of the present invention also includes a housing which is adapted to contain the processor. The housing also has the data input mechanism mounted on a data entry surface. An infrared light sensor is provided with the computer system for receiving infrared communication for the processor, while an infrared port is formed in the data entry surface of the housing for passage of infrared light to the infrared sensor.

The computer system of the present invention thus has an infrared port located on the same surface of the housing as the data entry mechanism. The infrared sensor is thus accessible to infrared light from the same frontal direction as data is entered into the computer system. The frontal infrared port may be the sole inlet for infrared light to the infrared sensor, or the computer system housing may have both a frontal infrared port and the conventional, rear-mounted infrared light port as well, if desired.

When the computer system housing is provided with both frontal and rear-mounted infrared ports, a light reflective mechanism, such as a mirror, can be provided. Such a light reflective mechanism can be made movable to selectively direct incoming infrared light from one or both of the infrared ports onto the infrared sensor. In this way, only one infrared sensor and associated infrared electronics are required for the computer system.

DESCRIPTION OF PREFERRED EMBODIMENT

Figure 1:
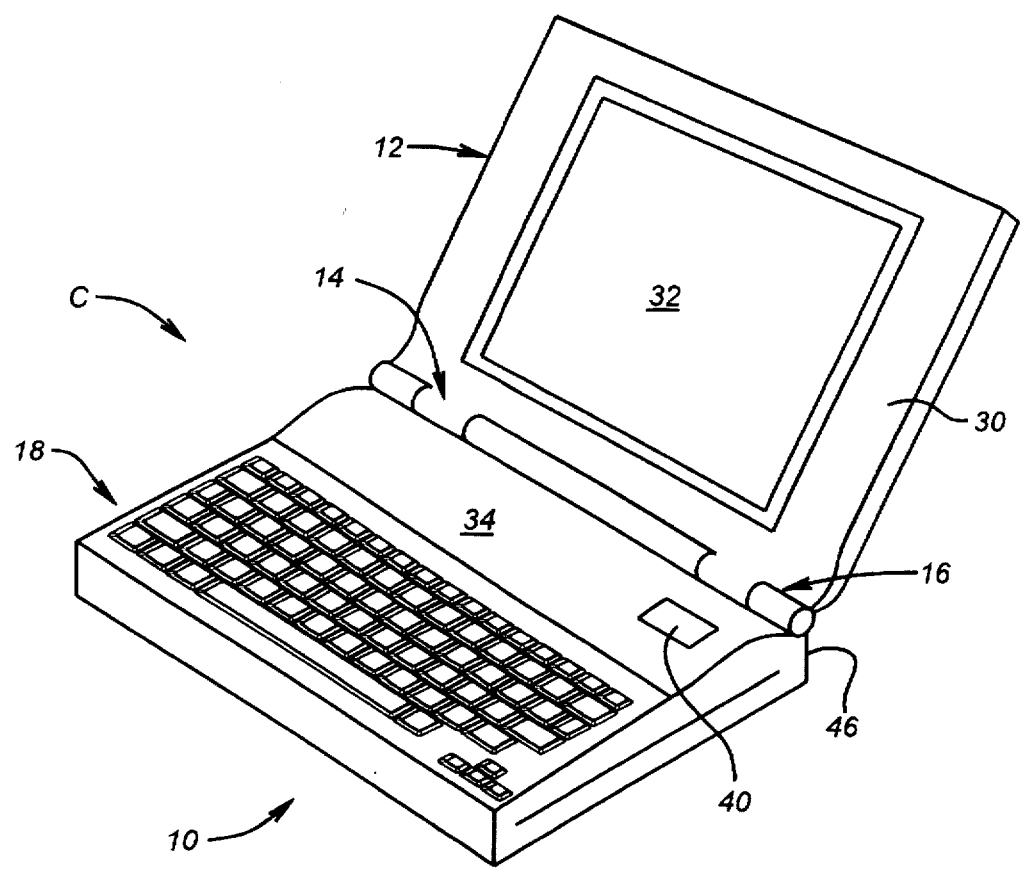
FIG. 1 is an isometric view of a portable computer system with infrared light communication capability according to the present invention.

In the drawings, a portable personal computer system C, with infrared (or IR) light communication capability according to the present invention is shown. The portable computer C shown in the drawings is a laptop or notebook computer which typically includes all of the capabilities and features of a desktop unit, but is in contrast relatively light and compact. The portable computer C can be operated in a variety of locations without need for alternating current power, by utilizing its own self-contained rechargeable batteries.

Figure 2:
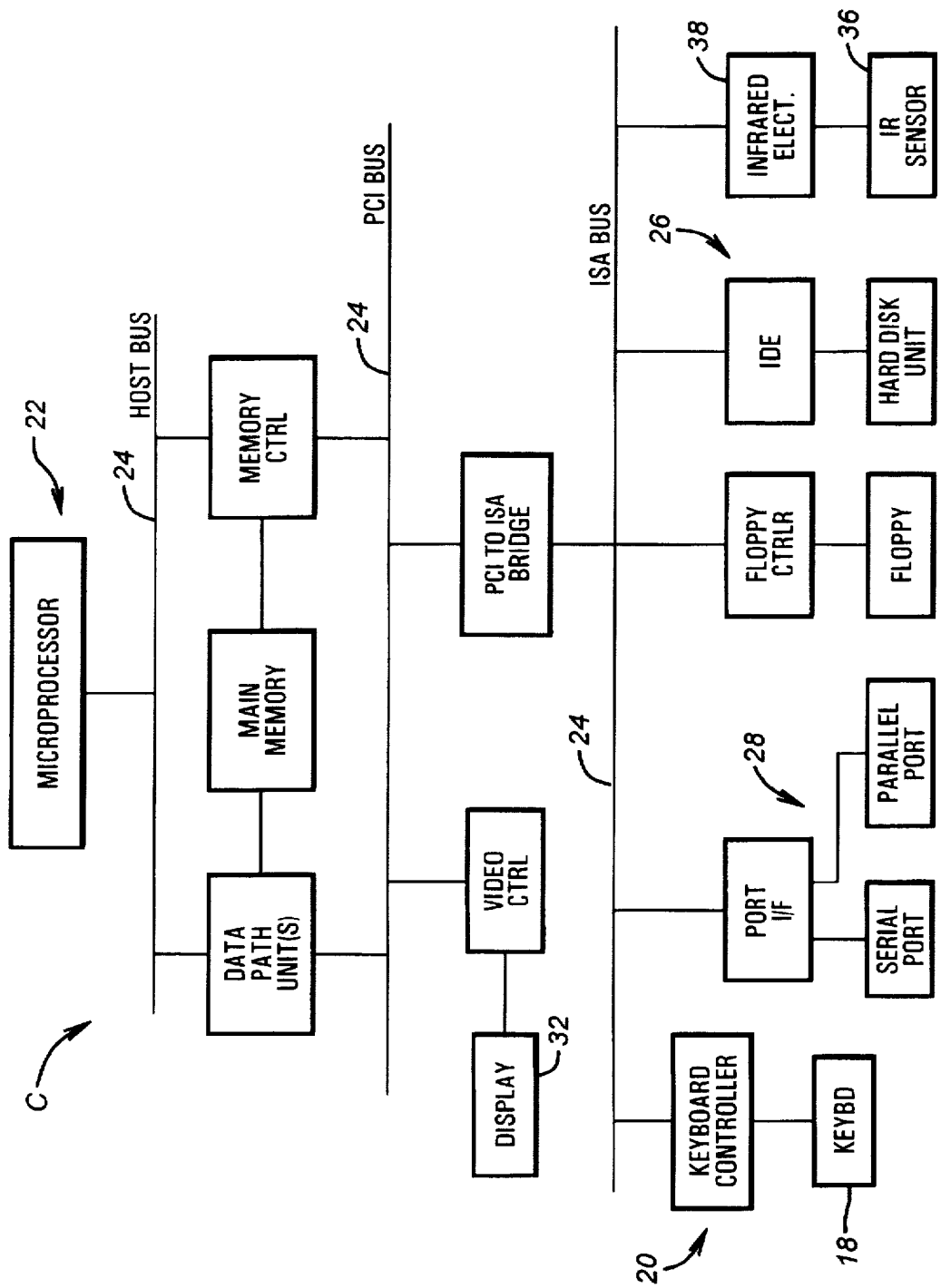
FIG. 2 is a simplified schematic electrical circuit diagram of the portable computer system of FIG. 1.

A number of conventional components (FIG. 2) are used in the computer system C. The description set forth below is exemplary of one embodiment of a portable personal computer. It should be understood that other computing configurations may be used, if desired.

The portable computer system C generally comprises for its transport container two sections 10 and 12 which are hinged together along adjacent longitudinal sides to each other at hinged connectors, such as indicated at 14 and 16. A first or base section 10 serves as a housing and includes a data entry mechanism, such as a keyboard 18 or touchpad or other data entry portion of an input/output section 20 of the computer system C. The keyboard 18 or other form of data entry mechanism permits entry of data and processing commands inot the computer system C.

The housing 10 contains a processor section 22, including one or more microprocessors, and associated personal computer system components including one or more system buses 24. The processor section 22 processed the data received from the keyboard 18 according to processing commands or signals from the keyboard 18 and also operating programs stored in memory. The computer system C also includes associated power supply circuitry, including conventional rechargeable batteries. A suitable number of mass memory storage devices, such as hard disk drives 26 or the like, and peripheral ports 28 are also mounted in the housing or base section 10.

The second or top housing section 12, includes a housing 30 which contains a data display 32. The data display is visible through an opening in the top section 12 and is driven by conventional control circuitry to display data furnished from processor section 22. Because the display 32 is typically a liquid crystal display (LCD), backlighting is generally required for the purposes of providing a contrasting background for the darker images.

The housings 10 and 12 of the computer system C are typically formed from a suitable strength rigid synthetic resin material to protect the electronic components contained therein. The housings 10 and 12 may be folded together about their hinged connections 14 and 16 and locked or latched to each other when the computer system C is not in use. The computer system C is opened by folding housing sections 10 and 12 apart so that the display 32 stands generally upright, while the housing 10 rests on a suitable support or surface. In this position, a frontal or data entry surface 34 of the housing 10 is accessible to the computer user face-on or in a frontal viewing position. The data entry surface 34 of the housing 10 has the data entry mechanism or keyboard 18 mounted on it.

Figure 4:
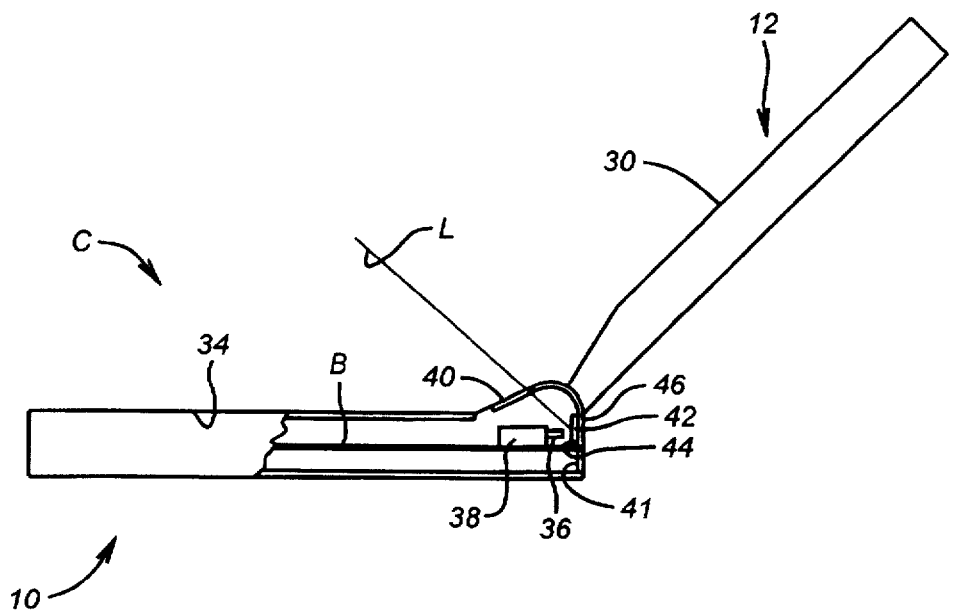
FIG. 4 is a side elevation view, taken partly in cross-section of the notebook computer of FIG. 1.

In the computer system C, an infrared (IR) sensor 36 mounted with other infrared electronics 38 (FIGS. 2 and 4) is suitably located such as on a circuit board B within the housing 10. According to the present invention, an infrared port 40 (FIGS. 3 and 4) is formed on the data entry or frontal surface 34 of the housing 10. In this manner, communications from a hand-held or portable infrared control transmitter is made possible from the same aspect or side of the computer system C on which is located the data entry mechanism 18.

The infrared port 40 may be made of any suitable material which is transparent or translucent to infrared energy. Examples include suitable types of synthetic resin or glass which are transparent or translucent to infrared light. In this manner, infrared signals providing infrared communication capability with remaining portions of the computer system C are possible through the infrared port 40. If desired, a mirror 42 or other surface reflective of infrared light may be mounted or otherwise formed along an inner surface 44 of a rear wall 46 of the housing 10. This permits infrared light as indicated by a line designated with reference numeral L to enter the infrared port 40 in the data entry or frontal surface 34. The incoming infrared light L is directed by the reflective surface 42 onto the infrared sensor 36, when sensor 36 is not located at a position directly facing the infrared port 40.

Figure 5:
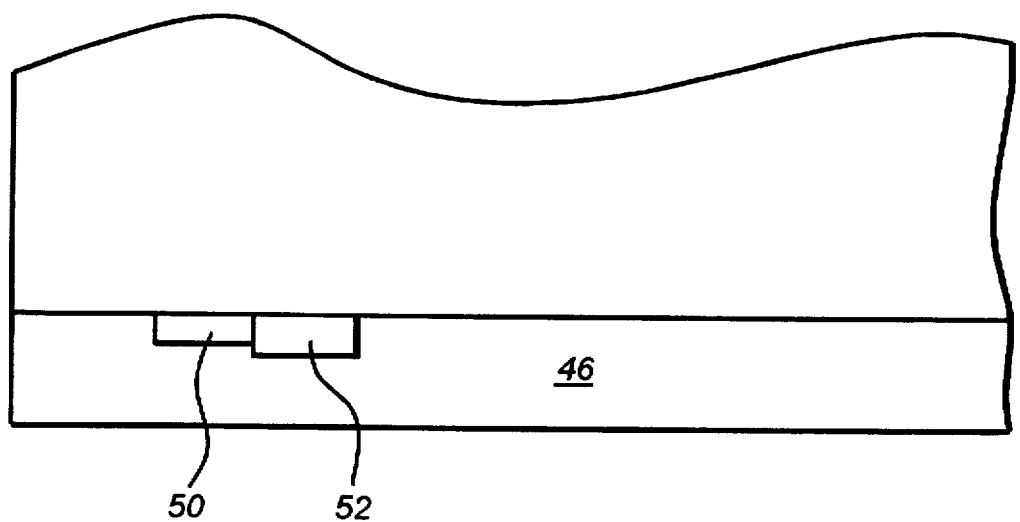
FIG. 5 is a rear elevation view of the notebook computer of FIG. 1.

The housing 10 may also be provided with a conventional, rear mounted infrared port 50 (FIG. 5) in the rear wall 46 of the housing 10. This permits infrared communication to be made to the computer system C through either the frontal surface 34 of the housing 10 through the port 40 or through the rear wall 46 through the rear mounted infrared port 50.

A movable sliding wall or door member 52 may be mounted in the rear wall 46 of the housing 10 to selectively open and close the port 50 to passage of infrared light. The movable wall 52 is movable laterally along the lateral extent of the rear wall 46 to allow selective closure or opening of the rear mounted infrared port 50.

Figure 3:
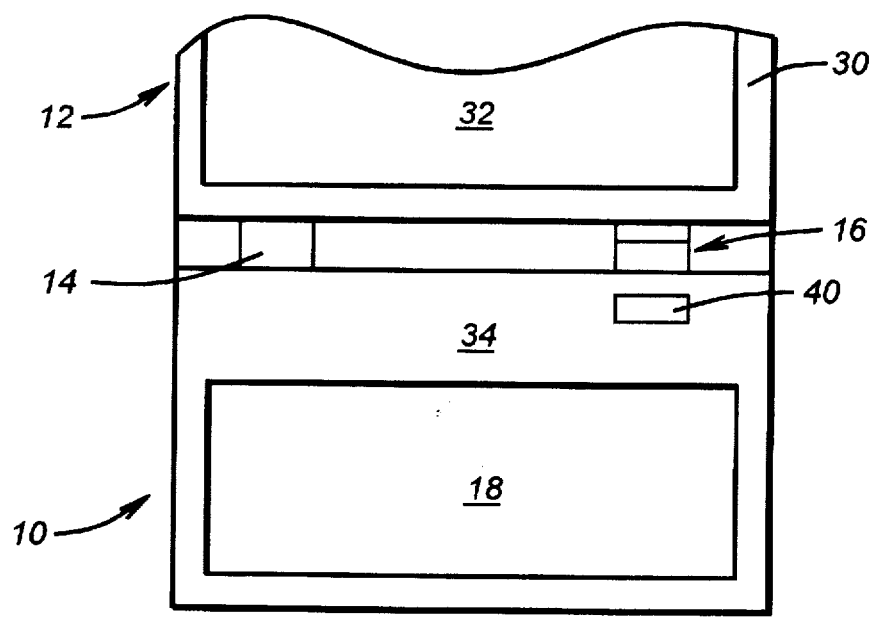
FIG. 3 is a top view of the notebook computer of FIG. 1.

The movable wall 52 is provided with an infrared light reflective surface or mirror on its inner surface in a like manner to mirror 41 on rear wall 46 shown in FIG. 3. The reflective surface on the movable wall 52 functions when the wall 52 is blocking passage of infrared light through the port 50 to reflect infrared light entering through the frontal port 40 and direct such reflected light onto the infrared sensor 36.

Accordingly, it can be seen that the present invention provides a new and improved personal computer system with infrared communication capability. The housing 10 which contains the processor 22, also has both the data input mechanism 18 and the infrared port 40 mounted on the data entry surface 34.

The infrared port 40 is thus located on the same surface 34 of the housing 10 as the data entry mechanism 18. The infrared sensor 36 is thus accessible to infrared light from the same frontal direction as data is entered into the computer system C. The frontal infrared port 40 may be the sole inlet for infrared light to the infrared sensor 36, or the computer system housing may have both a frontal infrared port 40 according to the present invention and the conventional, rear-mounted infrared light port 50 as well, if desired.

When the computer system housing 10 is provided with both the frontal port 40 and the rear-mounted infrared port 50, a light reflective mechanism, such as a mirror, can be provided. Such a light reflective mechanism is movable on the movable wall 52 to selectively direct incoming infrared light from either one of the infrared ports 40 and 50 onto the infrared sensor 36. In this way, only one infrared sensor 36 and associated infrared electronics 38 are required for the computer system C.

Having described the invention above, various modifications of the techniques, procedures, material and equipment will be apparent to those in the art. It is intended that all such variations within the scope and spirit of the appended claims be embraced thereby.

I claim:

1. A personal computer system with infrared light communication capability, comprising:
   a processor;
   a data entry input mechanism for entry of data into said processor;
   a housing containing said processor and having said data entry input mechanism mounted on a data entry surface thereof;
   an infrared light sensor for receiving infrared communications for said processor;
   an infrared receiving port coupled to said infrared light sensor and formed in said data entry surface of said housing for passage of infrared light to said infrared sensor; and
   a light reflective mechanism moveable to selectively block and pass light between said infrared port and said infrared sensor.

2. The personal computer system of claim 1 wherein said light reflective mechanism comprises a light reflective surface which is reflective of infrared light.

3. The personal computer system of claim 2, wherein said light reflective surface comprises a mirror.

4. The personal computer system of claim 1, further including
   said housing having a side wall; and
   an infrared port in said housing side wall for passage of infrared light to said infrared sensor.

5. The personal computer system of claim 4, wherein said light reflective mechanism selectively directs light entering said infrared port in said data entry surface and light entering said infrared port in said side wall onto said infrared sensor.

6. A personal computer system with infrared light communication capability, comprising:
   a processor;
   a data entry input mechanism for entry of data into said processor;
   a housing containing said processor and having said data entry input mechanism mounted on a data entry surface thereof;

an infrared sensor for receiving infrared communications for said processor; and an infrared port formed in said data entry surface of said housing for passage of infrared light to said infrared sensor;

said housing having a side wall;

an infrared port in said housing side wall for passage of infrared light to said infrared sensor; and a light reflective mechanism moveable to selectively block and pass light between said infrared port and said infrared sensor.

7. The personal computer system of claim 6, wherein said personal computer system is a laptop computer.

8. The personal computer system of claim 6, wherein said personal computer system is a notebook computer.

9. The personal computer system of claim 6, wherein said data entry input mechanism comprises a keyboard.

10. The personal computer system of claim 6, further including:

said housing having a rear side wall; and an infrared port in said housing rear side wall for passage of infrared light to said infrared sensor.

11. The personal computer system of claim 6 wherein said light reflective mechanism comprises a light reflective surface which is reflective of infrared light.

12. The personal computer system of claim 11, wherein said light reflective surface comprises a mirror.

13. The personal computer system of claim 6, wherein said light reflective mechanism selectively directs light entering said infrared port in said data entry surface and light entering said infrared port in said side wall onto said infrared sensor.

* * * * *